(12) United States Patent
Ishida et al.

(10) Patent No.: US 10,573,905 B2
(45) Date of Patent: Feb. 25, 2020

(54) POWER GENERATION CELL

(71) Applicant: HONDA MOTOR CO., LTD., Minato-Ku, Tokyo (JP)

(72) Inventors: Kentaro Ishida, Wako (JP); Yu Tomana, Wako (JP); Kenji Sasaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/170,412

(22) Filed: Oct. 25, 2018

(65) Prior Publication Data

US 2019/0131633 A1   May 2, 2019

(30) Foreign Application Priority Data

Oct. 26, 2017 (JP) .................... 2017-206898

(51) Int. Cl.
| | | |
|---|---|---|
| *H01M 2/38* | (2006.01) | |
| *H01M 2/40* | (2006.01) | |
| *H01M 8/24* | (2016.01) | |
| *H01M 2/02* | (2006.01) | |
| *H01M 2/08* | (2006.01) | |
| *H01M 8/10* | (2016.01) | |
| *H01M 8/20* | (2006.01) | |

(Continued)

(52) U.S. Cl.
CPC ......... *H01M 8/026* (2013.01); *H01M 8/0254* (2013.01); *H01M 8/0276* (2013.01); *H01M 8/1004* (2013.01); *H01M 8/2483* (2016.02); *H01M 8/0206* (2013.01); *H01M 8/0273* (2013.01)

(58) Field of Classification Search
None
See application file for complete search history.

(56) References Cited

U.S. PATENT DOCUMENTS

| | | | | |
|---|---|---|---|---|
| 9,966,623 B2 | 5/2018 | Tanaka et al. | | |
| 2001/0041281 A1* | 11/2001 | Wilkinson | .......... | H01M 8/0258 429/480 |
| 2007/0048585 A1* | 3/2007 | Kino | .................. | H01M 8/0206 429/434 |

FOREIGN PATENT DOCUMENTS

| | | |
|---|---|---|
| DE | 112012003942 T5 | 7/2014 |
| JP | 5239091 B2 | 7/2013 |

(Continued)

OTHER PUBLICATIONS

Office Action dated Aug. 30, 2019 issued over the corresponding German Patent Application No. 102018218276.0 with the English translation thereof.

(Continued)

*Primary Examiner* — Cynthia H Kelly
*Assistant Examiner* — Julian Anthony
(74) *Attorney, Agent, or Firm* — Carrier Blackman & Associates, P.C.; William D. Blackman; Joseph P. Carrier

(57) ABSTRACT

In a power generation cell, first bypass stop protrusions for preventing bypassing of an oxygen-containing gas are provided between an end of an oxygen-containing gas flow field in a flow field width direction and an outer peripheral bead. An end wavy ridge includes curves recessed away from the outer peripheral bead. The first bypass stop protrusions are provided between the recessed curves and the outer peripheral bead. A first metal separator has first support protrusions for supporting a cathode, between the recessed curves and the first bypass stop protrusions.

15 Claims, 8 Drawing Sheets

(51) Int. Cl.
*H01M 8/026* (2016.01)
*H01M 8/0254* (2016.01)
*H01M 8/2483* (2016.01)
*H01M 8/0276* (2016.01)
*H01M 8/1004* (2016.01)
H01M 8/0206 (2016.01)
H01M 8/0273 (2016.01)

(56) References Cited

FOREIGN PATENT DOCUMENTS

WO 2009/043600 A1 4/2009
WO 2016/055510 A1 4/2016

OTHER PUBLICATIONS

Search Report dated Aug. 30, 2019 issued over the corresponding German Patent Application No. 102018218276.0 with the English translation thereof.

* cited by examiner

POWER GENERATION CELL

CROSS-REFERENCE TO RELATED APPLICATION

This application is based upon and claims the benefit of priority from Japanese Patent Application No. 2017-206898 filed on Oct. 26, 2017, the contents of which are incorporated herein by reference.

BACKGROUND OF THE INVENTION

Field of the Invention

The present invention relates to a power generation cell including a metal separator having a bead seal and a wavy reactant gas flow field.

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly (MEA). The membrane electrode assembly is formed by providing an anode on one surface of the solid polymer electrolyte membrane, and providing a cathode on the other surface of the solid polymer electrolyte membrane. The MEA is sandwiched between separators (bipolar plates) to form a power generation cell (unit cell). A predetermined number of power generation cells are stacked together to form, e.g. an onboard fuel cell stack mounted on a vehicle.

In the power generation cell, metal separators may be used as the separators. A fuel gas flow field for allowing a fuel gas, as one of reactant gases, to flow along an anode is formed in an anode side metal separator, and an oxygen-containing gas flow field for allowing an oxygen-containing gas, as the other of the reactant gases, to flow along a cathode is formed in a cathode side metal separator. The anode side metal separator is provided on one surface of the MEA, and the cathode side metal separator is provided on the other surface of the MEA.

According to the disclosure of Japanese Patent No. 5239091, a ridge shaped bead seal (boundary wall 7) is formed by press forming as a seal in a metal separator, to reduce production costs. Further, in Japanese Patent No. 5239091, a reactant gas flow field is provided in a metal separator, and bypass stop protrusions (limitation elements 10) are provided between the bead seal and the reactant gas flow field, to prevent bypassing of a reactant gas at an end of the reactant gas flow field in the flow field width direction.

SUMMARY OF THE INVENTION

In Japanese Patent No. 5239091, an end of the MEA in the width direction is supported by the bypass stop protrusions. However, at positions where the bypass stop protrusions are not provided, it is not possible to support the end of the MEA in the width direction. Therefore, the surface pressure is decreased at the positions where the end of the MEA in the width direction is not supported by the bypass stop protrusions. The decrease in surface pressure may degrade power generation performance and durability.

The present invention has been made taking such a problem into account, and an object of the present invention is to provide a power generation cell which makes it possible to suppress the decrease in surface pressure at an end in the width direction of the reactant gas flow field of a metal separator.

In order to achieve the above object, the present invention provides a power generation cell. The power generation cell includes a membrane electrode assembly formed by providing electrodes on both sides of an electrolyte membrane, and metal separators provided on both sides of the membrane electrode assembly. The power generation cell has a plurality of wavy ridges extending from one end to the other end of the metal separators, and a plurality of wavy flow grooves formed between the plurality of wavy ridges. A reactant gas flow field is formed in the power generation cell, for allowing a reactant gas to flow from the one end to the other end of the metal separators along a power generation surface. A bead seal configured to prevent leakage of the reactant gas is provided around the reactant gas flow field. A bypass stop protrusion configured to prevent bypassing of the reactant gas is formed between an end of the reactant gas flow field in a flow field width direction and the bead seal. In the power generation cell, the bypass stop protrusion is provided between a recessed curve recessed away from the bead seal at the end of the wavy ridges in the flow field width direction, and the bead seal, and at least one of the metal separators includes a support protrusion configured to support the electrode, between the recessed curve and the bypass stop protrusion.

Preferably, the support protrusion is provided in each of one of the metal separators and the other of the metal separators.

Preferably, the support protrusion of one of the metal separators and the support protrusion of the other of the metal separators are arranged alternately in a direction in which the wavy ridges extend.

Preferably, a shape of the support protrusion of one of a pair of the metal separators is different from a shape of the support protrusion of the other of the pair of the metal separators.

Preferably, the support protrusion of one of the metal separators faces the wavy ridge provided at the end in the flow field width direction of the other of the metal separators through the membrane electrode assembly.

Preferably, a frame shaped resin film is provided in an outer peripheral portion of the membrane electrode assembly, and the support protrusion supports the electrode at a position where the membrane electrode assembly and the resin film overlap each other in a thickness direction.

Preferably, a plurality of the bypass stop protrusions are provided at intervals in a direction in which the wavy ridges extend.

Preferably, a recess protruding on a coolant surface side is provided in a vicinity of the support protrusion, and a front end of the protrusion on a back of the recess abuts on the metal separator adjacent to the protrusion.

In the power generation cell of the present invention, it is possible to support the end of the membrane electrode assembly in the width direction not only by the bypass stop protrusion but also by the support protrusion. Therefore, it is possible to prevent decrease in the surface pressure (tightening load) at the end of the membrane electrode assembly in the width direction. Accordingly, it is possible to suppress decrease in power generation performance and durability due to the decrease in the surface pressure applied to the power generation cell.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a power generation cell of the present invention will be described with reference to the accompanying drawings.

Figure 1:
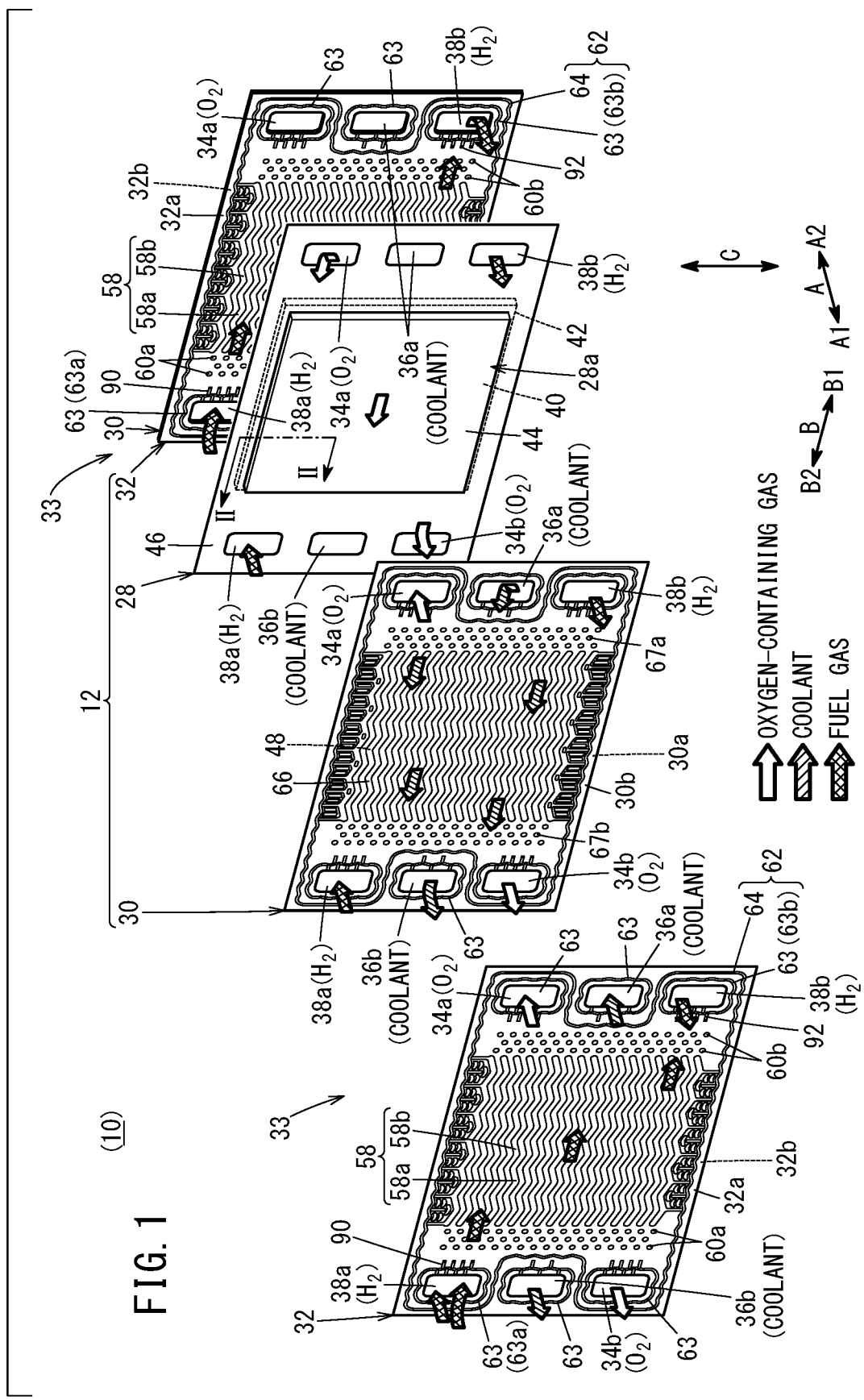
FIG. 1 is an exploded perspective view showing a power generation cell according to an embodiment of the present invention.

A power generation cell 12 forming a unit of a fuel cell shown in FIG. 1 includes a resin film equipped MEA (membrane electrode assembly) 28, a first metal separator 30 provided on one side of the resin film equipped MEA 28 (in the direction indicated by the arrow A1), and a second metal separator 32 provided on the other side of the resin film equipped MEA 28 (in the direction indicated by the arrow A2). A fuel cell stack 10 is formed by stacking a plurality of power generation cells 12, e.g., in a direction indicated by the arrow A (horizontal direction) or in a direction indicated by the arrow C (gravity direction), and applying a tightening load (compression load) in the stacking direction to the power generation cells 12. For example, the fuel cell stack 10 is mounted as an onboard fuel cell stack on a fuel cell electric automobile (not shown).

Each of the first metal separator 30 and the second metal separator 32 is formed by press forming of a metal thin plate to have a corrugated shape in cross section. For example, the metal plate is a steel plate, a stainless steel plate, an aluminum plate, a plated steel plate, or a metal plate having an anti-corrosive treated surface. The first metal separator 30 of one of adjacent power generation cells 12 and the second metal separator 32 of the other power generation cell 12 are joined together by welding, brazing, caulking, etc. to form a joined separator 33.

At one end of the power generation cell 12 in the longitudinal direction (horizontal direction) (at the one end in the direction indicated by the arrow B1), an oxygen-containing gas supply passage 34a, a coolant supply passage 36a, and a fuel gas discharge passage 38b are provided. The oxygen-containing gas supply passage 34a, the coolant supply passage 36a, and the fuel gas discharge passage 38b extend through the power generation cell 12 in the stacking direction (indicated by the arrow A). The oxygen-containing gas supply passage 34a, the coolant supply passage 36a, and the fuel gas discharge passage 38b are arranged in the vertical direction indicated by the arrow C. An oxygen-containing gas is supplied through the oxygen-containing gas supply passage 34a. A coolant such as water is supplied through the coolant supply passage 36a. A fuel gas such as a hydrogen-containing gas is discharged through the fuel gas discharge passage 38b.

At the other end of the power generation cell 12 in the longitudinal direction (the other end in the direction indicated by the arrow B2), a fuel gas supply passage 38a, a coolant discharge passage 36b, and an oxygen-containing gas discharge passage 34b are provided. The fuel gas supply passage 38a, the coolant discharge passage 36b, and the oxygen-containing gas discharge passage 34b extend through the power generation cell 12 in the stacking direction. The fuel gas supply passage 38a, the coolant discharge passage 36b, and the oxygen-containing gas discharge passage 34b are arranged in the vertical direction. The fuel gas is supplied through the fuel gas supply passage 38a. The coolant is discharged through the coolant discharge passage 36b. The oxygen-containing gas is discharged through the oxygen-containing gas discharge passage 34b. The layout of the oxygen-containing gas supply passage 34a, the oxygen-containing gas discharge passage 34b, the fuel gas supply passage 38a, and the fuel gas discharge passage 38b is not limited to the above embodiment, and may be changed as necessary depending on the required specifications.

Figure 2:
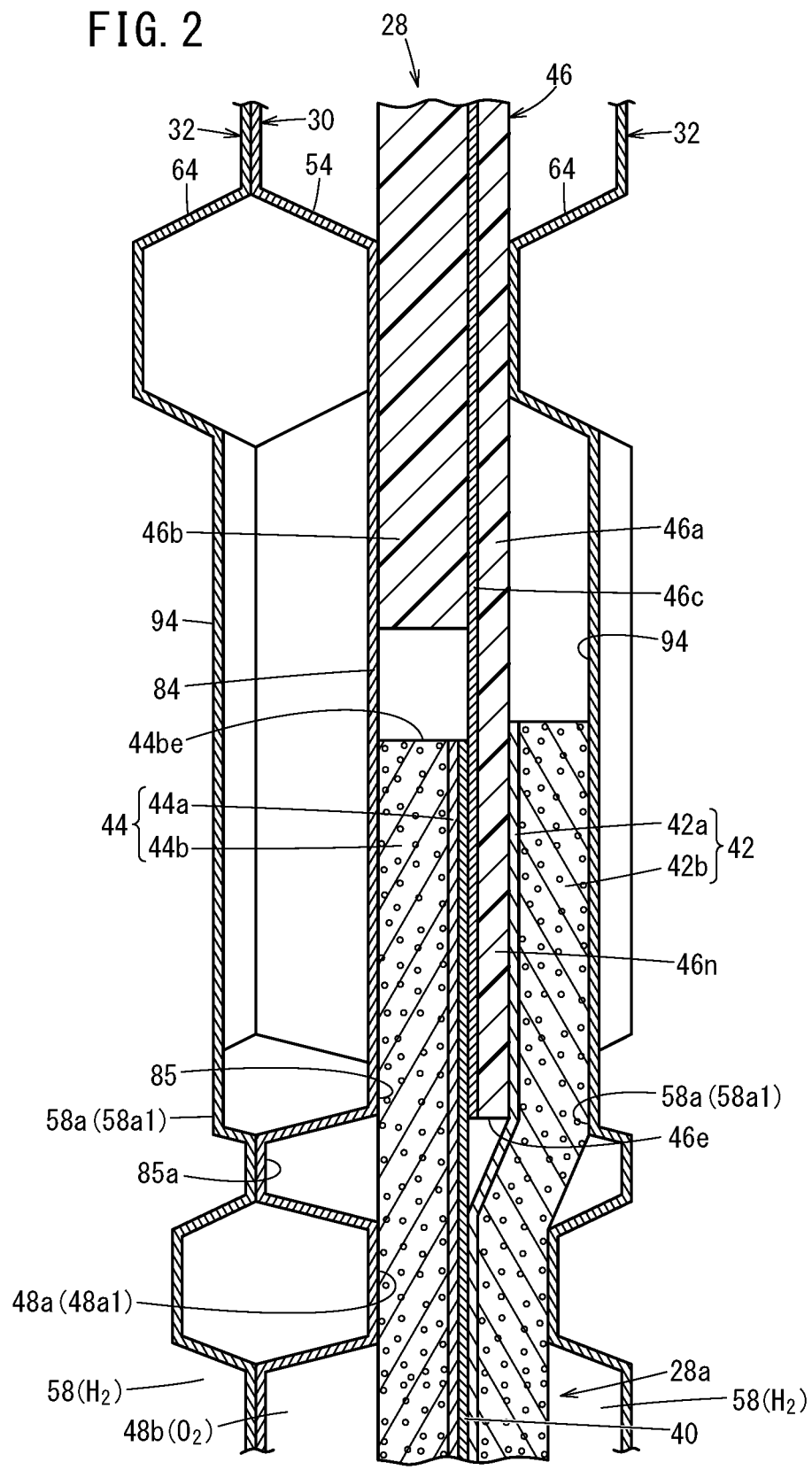
FIG. 2 is a cross sectional view showing the power generation cell taken along a line II-II in FIGS. 1 and 4.

As shown in FIG. 2, the resin film equipped MEA 28 includes a membrane electrode assembly 28a (hereinafter referred to as "MEA 28a") and a frame shaped resin film 46 provided in a peripheral portion of the MEA 28a.

The MEA 28a includes an electrolyte membrane 40, an anode 42 and a cathode 44 provided on both surfaces of the electrolyte membrane 40. For example, the electrolyte membrane 40 is a solid polymer electrolyte membrane (cation ion exchange membrane). The solid polymer electrolyte membrane is a thin membrane of perfluorosulfonic acid containing water, for example. The electrolyte membrane 40 is interposed between the anode 42 and the cathode 44. A fluorine based electrolyte may be used as the electrolyte membrane 40. Alternatively, an HC (hydrocarbon) based electrolyte may be used as the electrolyte membrane 40.

The cathode 44 includes a first electrode catalyst layer 44a joined to one surface of the electrolyte membrane 40 and a first gas diffusion layer 44b stacked on the first electrode catalyst layer 44a. The anode 42 includes a second electrode catalyst layer 42a joined to the other surface of the electrolyte membrane 40 and a second gas diffusion layer 42b stacked on the second electrode catalyst layer 42a.

The first electrode catalyst layer 44a and the second electrode catalyst layer 42a are formed on both surfaces of the electrolyte membrane 40. For example, the first electrode catalyst layer 44a is formed by porous carbon particles deposited uniformly on the surface of the first gas diffusion layer 44b together with an ion conductive polymer binder, and platinum alloy is supported on the porous carbon particles. For example, the second electrode catalyst layer 42a is formed by porous carbon particles deposited uniformly on the surface of the second gas diffusion layer 42b together with an ion conductive polymer binder, and platinum alloy is supported on the porous carbon particles. Each of the first gas diffusion layer 44b and the second gas diffusion layer 42b comprises a carbon paper or a carbon cloth, etc.

As shown in FIG. 1, at the end of the resin film 46 in the direction indicated by the arrow B1, the oxygen-containing gas supply passage 34a, the coolant supply passage 36a, and the fuel gas discharge passage 38b are provided. At the end of the resin film 46 in the direction indicated by the arrow B2, the fuel gas supply passage 38a, the coolant discharge passage 36b, and the oxygen-containing gas discharge passage 34b are provided.

As shown in FIG. 2, the resin film 46 includes two frame shaped sheets 46a, 46b having different thicknesses.

Specifically, the resin film 46 includes a first frame shaped sheet 46a and a second frame shaped sheet 46b. The inner peripheral portion of the first frame shaped sheet 46a is joined to the outer peripheral portion of the MEA 28a. The second frame shaped sheet 46b is joined to the first frame shaped sheet 46a. The first frame shaped sheet 46a and the second frame shaped sheet 46b are joined together in the thickness direction by an adhesive layer 46c made of adhesive. The second frame shaped sheet 46b is joined to the outer peripheral portion of the first frame shaped sheet 46a.

Each of the first frame shaped sheet 46a and the second frame shaped sheet 46b is made of resin material. Examples of the materials of the first frame shaped sheet 46a and the second frame shaped sheet 46b include PPS (polyphenylene sulfide), PPA (polyphthalamide), PEN (polyethylene naphthalate), PES (polyethersulfone), LCP (liquid crystal polymer), PVDF (polyvinylidene fluoride), silicone resin, fluororesin, m-PPE (modified polyphenylene ether) resin, PET (polyethylene terephthalate), PBT (polybutylene terephthalate), or modified polyolefin.

The inner peripheral portion 46n of the resin film 46 (the inner peripheral portion of the first frame shaped sheet 46a) is provided between the outer peripheral portion of the anode 42 and the outer peripheral portion of the cathode 44. Specifically, the inner peripheral portion 46n of the resin film 46 is held between the outer peripheral portion of the electrolyte membrane 40 and the outer peripheral portion of the anode 42. The inner peripheral portion 46n of the resin film 46 and the outer peripheral portion of the electrolyte membrane 40 are joined together by the adhesive layer 46c. It should be noted that the inner peripheral portion 46n of the resin film 46 may be held between the electrolyte membrane 40 and the cathode 44. It should be noted that the electrolyte membrane 40 may protrude outward without using the resin film 46. Further, frame shaped films may be provided on both sides of the electrolyte membrane 40 which protrudes outward.

Figure 3:
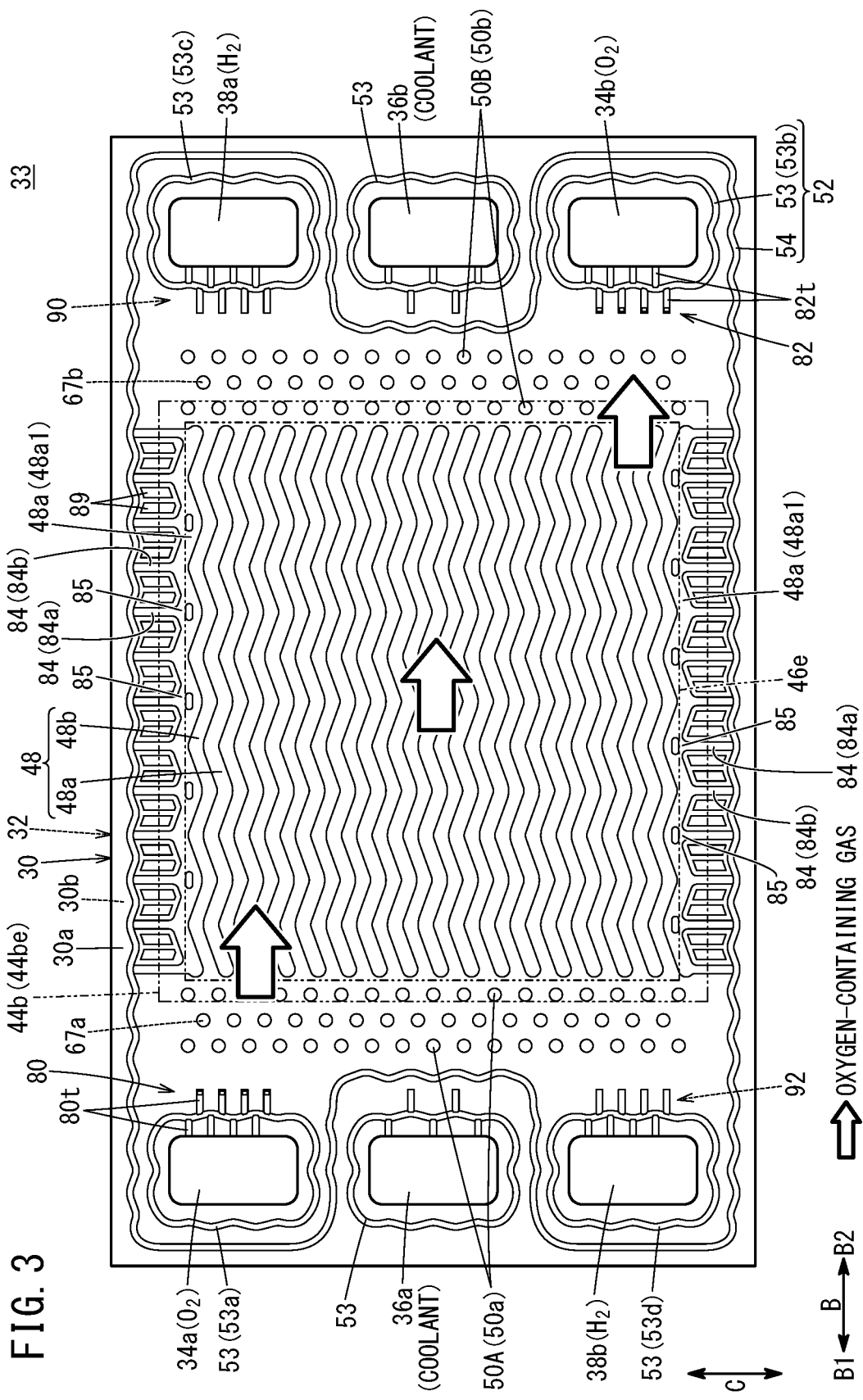
FIG. 3 is a plan view showing the joined separators as viewed from the side of a first metal separator.

As shown in FIG. 3, an oxygen-containing gas flow field 48 is provided on a surface 30a of the first metal separator 30 facing the resin film equipped MEA 28 (hereinafter referred to as the "surface 30a"). For example, the oxygen-containing gas flow field 48 extends in the direction indicated by the arrow B. The oxygen-containing gas flow field 48 is connected to (in fluid communication with) the oxygen-containing gas supply passage 34a and the oxygen-containing gas discharge passage 34b. The oxygen-containing gas flow field 48 includes a plurality of wavy flow grooves 48b between a plurality of wavy ridges 48a extending in the direction indicated by the arrow B. Therefore, in the oxygen-containing gas flow field 48, the plurality of wavy ridges 48a and the plurality of wavy flow grooves 48b are provided alternately in a flow field width direction (in the direction indicated by the arrow C).

Side walls on both sides of the wavy ridges 58a in the width direction (in the direction indicated by the arrow C) are inclined from the separator thickness direction, and the cross sectional shape of the wavy ridges 48a is a trapezoidal shape. It should be noted that the side walls on both sides of the wavy ridges 48a in the width direction may be in parallel with the separator thickness direction, and the cross sectional shape of the wavy ridges 48a may be a rectangular shape. The shape of the wavy ridges 48a is not limited specifically, as long as the wavy ridges 48a have an uneven shape which is not straight in the direction (indicated by the arrow B) in which the wavy ridges 48a extend. Hereinafter, among the plurality of wavy ridges 48a, the ridges provided at both ends in the flow field width direction will be referred to as "end wavy ridges 48a1". The end wavy ridges 48a1 are provided inside the outer end 44be of the first gas diffusion layer 44b.

An inlet buffer 50A is provided on the surface 30a of the first metal separator 30, between the oxygen-containing gas supply passage 34a and the oxygen-containing gas flow field 48. The inlet buffer 50A includes a plurality of boss arrays each including a plurality of bosses 50a arranged in the direction indicated by the arrow C. Further, an outlet buffer 50B is provided on the surface 30a of the first metal separator 30, between the oxygen-containing gas discharge passage 34b and the oxygen-containing gas flow field 48.

The outlet buffer 50B includes a plurality of boss arrays each including a plurality of bosses 50b.

On a surface 30b of the first metal separator 30 opposite to the oxygen-containing gas flow field 48, boss arrays each including a plurality of bosses 67a arranged in the direction indicated by the arrow C are provided between the boss arrays of the inlet buffer 50A, and boss arrays each including a plurality of bosses 67b arranged in the direction indicated by the arrow C are provided between the boss arrays of the outlet buffer 50B (see FIG. 1). The bosses 67a, 67b protruding on the coolant surface side form a buffer on the coolant surface.

A first seal line 52 is formed on the surface 30a of the first metal separator 30 by press forming. The first seal line 52 protrudes toward the resin film equipped MEA 28 (FIG. 1). Though not shown, resin material may be fixed to the protruding front surfaces of the first seal line 52 by printing, coating, etc. The resin material may be absent.

The first seal line 52 includes a plurality of bead seals 53 provided around a plurality of fluid passages (oxygen-containing gas supply passage 34a, etc.), respectively (hereinafter referred to as the "passage beads" 53), and a bead seal 54 provided around the oxygen-containing gas flow field 48, the inlet buffer 50A, and the outlet buffer 50B (hereinafter referred to as the "outer peripheral bead 54").

The plurality of passage beads 53 protrude from the surface 30a of the first metal separator 30 toward the resin film equipped MEA 28, and provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively. Hereinafter, among the plurality of passage beads 53, the passage bead provided around the oxygen-containing gas supply passage 34a will be referred to as the "passage bead 53a", and the passage bead provided around the oxygen-containing gas discharge passage 34b will be referred to as the "passage bead 53b".

The first metal separator 30 has bridge sections 80, 82 connecting the inside (fluid passages 34a, 34b side) of the passage beads 53a, 53b and the outside (oxygen-containing gas flow field 48 side) of the passage beads 53a, 53b. The bridge section 80 is provided adjacent to a side of the passage bead 53a formed around the oxygen-containing gas supply passage 34a, on the side closer to the oxygen-containing gas flow field 48. The bridge section 82 is provided adjacent to a side of the passage bead 53b formed around the oxygen-containing gas discharge passage 34b, on the side closer to the oxygen-containing gas flow field 48.

The bridge sections 80, 82 include a plurality of tunnels 80t, 82t provided inside and outside the passage beads 53a, 53b, respectively. The tunnels 80t, 82t are formed by press forming in a manner that the tunnels 80t, 82t protrude from the surface 30a of the first metal separator 30 toward the resin film equipped MEA 28.

First bypass stop protrusions 84 are provided between both ends of the oxygen-containing gas flow field 48 in the width direction (the end wavy ridges 48a1) and the outer peripheral bead 54. The first bypass stop protrusions 84 prevent bypassing of the oxygen-containing gas from the oxygen-containing gas supply passage 34a to the oxygen-containing gas discharge passage 34b. In the embodiment of the present invention, the flow field width direction of the oxygen-containing gas flow field 48 is the direction (indicated by the arrow C) along the short sides of the rectangular first metal separator 30. The first bypass stop protrusions 84 are formed to protrude toward the resin film equipped MEA 28 (see FIG. 2). A plurality of the first bypass stop protrusions 84 are arranged at intervals in the direction (indicated by the arrow B) in which the end wavy ridges 48a1 extend.

Figure 4:
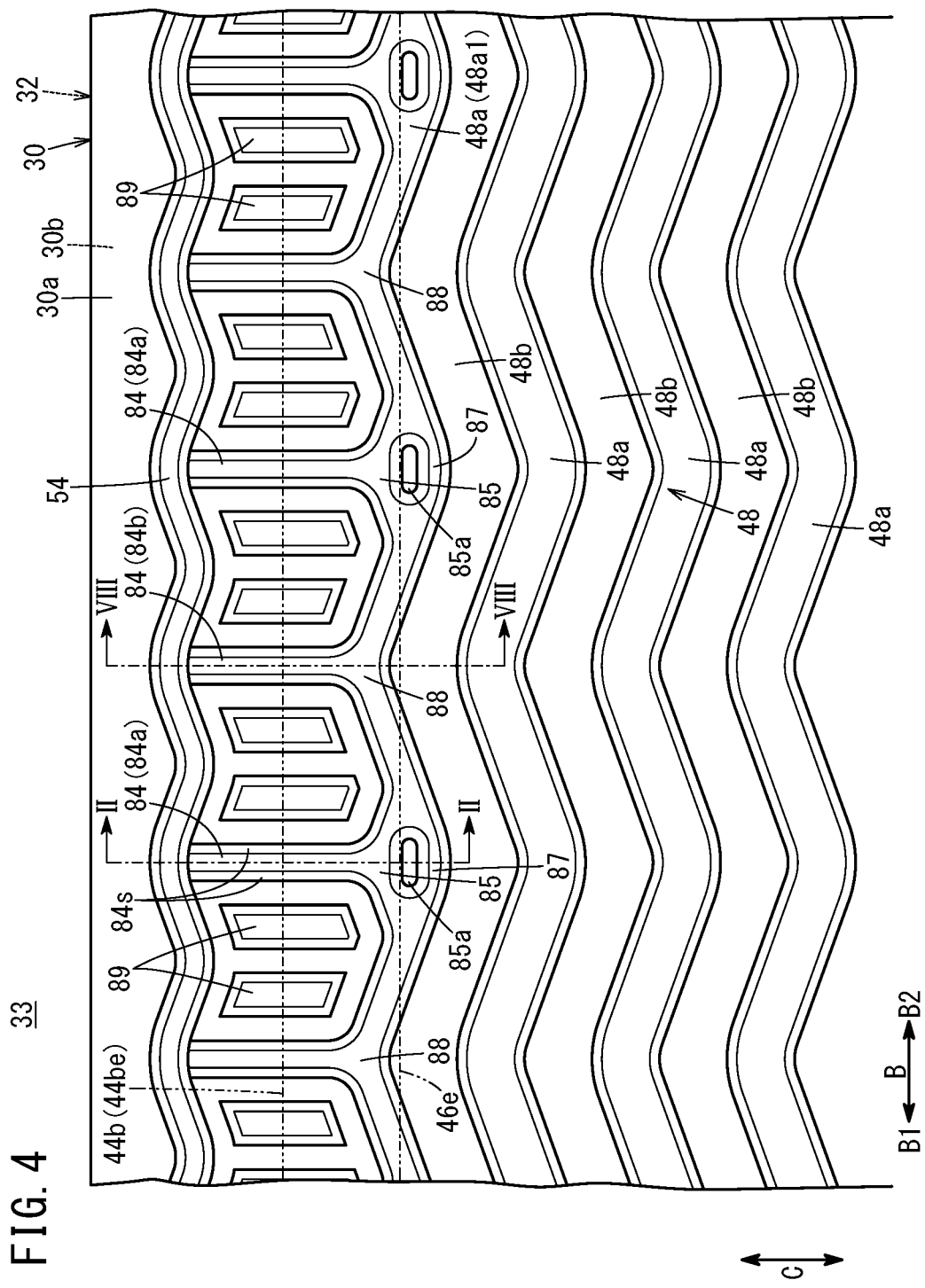
FIG. 4 is an enlarged plan view showing main components of the first metal separator.

In FIG. 4, the side walls 84s on both sides of each of the first bypass stop protrusions 84 in their width direction (indicated by the arrow B) are inclined from the separator thickness direction, and the cross sectional shape of the first bypass stop protrusions 84 is a trapezoidal shape. It should be noted that the side walls 84s on both sides of the first bypass stop protrusions 84 in the width direction may be in parallel with the separator thickness direction, and the cross sectional shape of the first bypass stop protrusions 84 may be a rectangular shape.

Each of the end wavy ridges 48a1 includes recessed curves 87 recessed away from the outer peripheral bead 54, and protruding curves 88 protruding toward the outer peripheral bead 54. The plurality of first bypass stop protrusions 84 include first bypass stop protrusions 84a provided between the recessed curves 87 of the end wavy ridge 48a1 and the outer peripheral bead 54, and first bypass stop protrusions 84b provided between the protruding curves 88 of the end wavy ridge 48a1 and the outer peripheral bead 54. The first bypass stop protrusions 84a and the first bypass stop protrusions 84b are provided alternately at intervals in the direction in which the end wavy ridges 48a1 extend.

The first bypass stop protrusions 84a each have one end connected to the outer peripheral bead 54, and the other end connected to the recessed curve 87 of the end wavy ridge 48a1. The first bypass stop protrusions 84b each have one end connected to the outer peripheral bead 54, and the other end connected to the protruding curve 88 of the end wavy ridge 48a1. Intermediate protrusions 89 supporting the outer peripheral portion of the MEA 28a are provided between the first bypass stop protrusions 84a, 84b that are adjacent to each other.

The intermediate protrusions 89 protrude toward the resin film equipped MEA 28. A plurality of the intermediate protrusions 89 are provided in each area between the first bypass stop protrusions 84a, 84b that are adjacent to each other. In FIG. 4, for example, two intermediate protrusions 89 are provided between the first bypass stop protrusions 84a, 84b that are adjacent to each other, at intervals in the direction in which the end wavy ridge 48a1 extends. The intermediate protrusions 89 are formed to intersect the direction in which the end wavy ridge 48a1 extends. The intermediate protrusions 89 are provided at positions overlapping with the outer end 44be of the first gas diffusion layer 44b, as viewed in the stacking direction.

In the first metal separator 30, first support protrusions 85 are provided between the recessed curves 87 of the end wavy ridge 48a1 and the first bypass stop protrusions 84a. The first support protrusions 85 support the cathode 44 (first gas diffusion layer 44b). The first support protrusions 85 are formed by press forming to protrude toward the resin film equipped MEA 28. In the embodiment of the present invention, each of the first support protrusions 85 integrally continues to the first bypass stop protrusion 84a, and integrally continues to the recessed curve 87 of the end wavy ridge 48a1.

As shown in FIG. 2, the first support protrusion 85 supports the cathode 44 (first gas diffusion layer 44b) at a position where the MEA 28a and the resin film 46 overlap each other in the thickness direction. As shown in FIG. 3, each of the first support protrusions 85 is provided at a position corresponding to the inner peripheral portion 46n of the frame shaped resin film 46 (at a position overlapping with the inner peripheral portion 46n of the resin film 46 as viewed in the stacking direction).

As shown in FIG. 4, a recess 85a is provided adjacent to the first support protrusion 85. The recess 85a is recessed away from the cathode 44 (the outer back surface of the recess 85a protrudes toward the coolant surface to form an abutting protrusion). The recess 85a is positioned on an extension line of the first bypass stop protrusion 84a. The recess 85a is provided in correspondence with each of a plurality of the first support protrusions 85. That is, a plurality of the recesses 85a are formed in the direction in which the end wavy ridge 48a1 extends. As shown in FIG. 2, the front end of the abutting protrusion, on the back of the recess 85a, abuts on the second metal separator 32 which is adjacent to the abutting protrusion.

As shown in FIG. 1, the second metal separator 32 has a fuel gas flow field 58 on its surface 32a facing the resin film equipped MEA 28 (hereinafter referred to as the "surface 32a"). For example, the fuel gas flow field 58 extends in the direction indicated by the arrow B.

Figure 5:
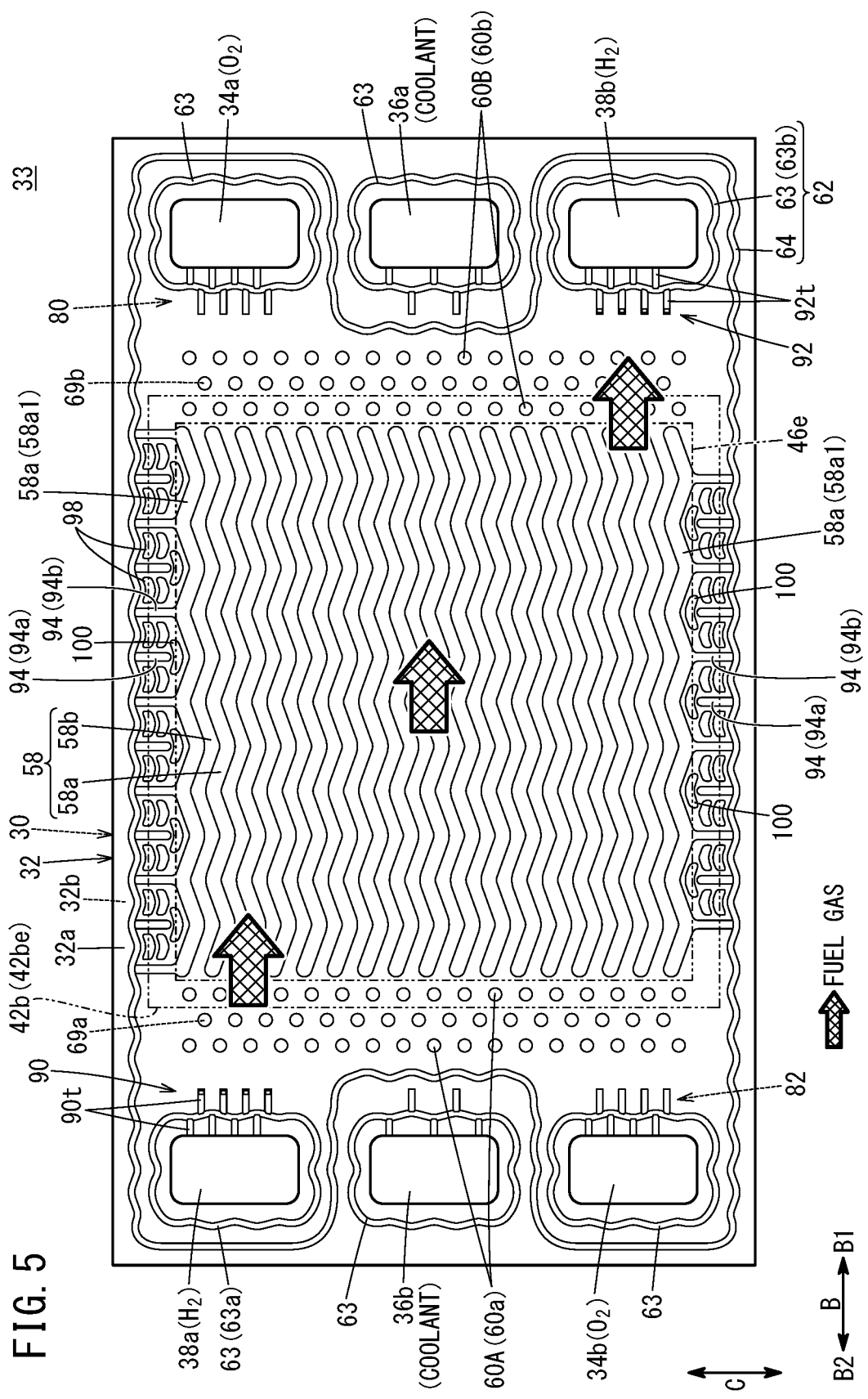
FIG. 5 is a plan view showing the joined separators as viewed from the side of the second metal separator.

As shown in FIG. 5, the fuel gas flow field 58 is connected to (in fluid communication with) the fuel gas supply passage 38a and the fuel gas discharge passage 38b. The fuel gas flow field 58 includes a plurality of wavy flow grooves 58b between a plurality of wavy ridges 58a extending in the direction indicated by the arrow B. Therefore, in the fuel gas flow field 58, the plurality of wavy ridges 58a and the plurality of wavy flow grooves 58b are provided alternately in the flow field width direction indicated by the arrow C. Hereinafter, among the plurality of wavy ridges 58a, the ridges 58a provided at both ends in the flow field width direction will be referred to as "end wavy ridges 58a1". The end wavy ridges 58a1 are provided inside the outer ends 42be of the second gas diffusion layer 42b. An inlet buffer 60A is provided on the surface 32a of the second metal separator 32, between the fuel gas supply passage 38a and the fuel gas flow field 58. The inlet buffer 60A includes a plurality of boss arrays each including a plurality of bosses 60a extending in the direction indicated by the arrow C. Further, an outlet buffer 60B including a plurality of boss arrays is provided on the surface 32a of the second metal separator 32, between the fuel gas discharge passage 38b and the fuel gas flow field 58. Each of the boss arrays includes a plurality of bosses 60b.

On a surface 32b of the second metal separator 32, opposite to the fuel gas flow field 58, boss arrays each including a plurality of bosses 69a arranged in the direction indicated by the arrow C are provided between the boss arrays of the inlet buffer 60A, and boss arrays each including a plurality of bosses 69b arranged in the direction indicated by the arrow C are provided between the boss arrays of the outlet buffer 60B. The bosses 69a, 69b form a buffer on the coolant surface.

A second seal line 62 is formed on the surface 32a of the second metal separator 32 by press forming to protrude toward the resin film equipped MEA 28. Though not shown in detail, resin material is fixed to the protruding front end surface of the second seal line 62 by printing or coating. The resin material may be absent.

As shown in FIG. 5, the second seal line 62 includes a plurality of bead seals 63 (hereinafter referred to as "passage beads 63") provided around a plurality of fluid passages (fluid passages 38a, etc.), respectively, and a bead seal 64 (hereinafter also referred to as "outer peripheral bead 64") provided around the fuel gas flow field 58, the inlet buffer 60A, and the outlet buffer 60B.

The plurality of passage beads 63 protrude from the surface 32a of the second metal separator 32, and are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively. Hereinafter, among the plurality of passage beads 63, the passage bead formed around the fuel gas supply passage 38a will be referred to as "passage bead 63a", and the passage bead formed around the fuel gas discharge passage 38b will be referred to as "passage bead 63b".

The second metal separator 32 has bridge sections 90, 92 connecting the inside (fluid passages 38a, 38b side) of the passage beads 63a, 63b around the fuel gas supply passage 38a and the fuel gas discharge passage 38b and the outside (fuel gas flow field 58 side) of the passage beads 63a, 63b. The bridge section 90 is provided adjacent to a side of the passage bead 63a formed around the fuel gas supply passage 38a, on the side closer to the fuel gas flow field 58. The bridge section 92 is provided adjacent to a side of the passage bead 63b formed around the fuel gas discharge passage 38b, on the side closer to the fuel gas flow field 58. Bridges in the bridge section 92 are provided at intervals.

The bridge sections 90, 92 include a plurality of tunnels 90t, 92t inside and outside the passage beads 63a, 63b. The tunnels 90t, 92t are formed by press forming to protrude from the surface 32a of the second metal separator 32 toward the resin film equipped MEA 28 (see FIG. 2).

Second bypass stop protrusions 94 are provided between both ends of the fuel gas flow field 58 in the width direction (the end wavy ridges 58a1) and the outer peripheral bead 64. The second bypass stop protrusions 94 prevent bypassing of the fuel gas from the fuel gas supply passage 38a to the fuel gas discharge passage 38b. In the embodiment of the present invention, the flow field width direction of the fuel gas flow field 58 is the direction (indicated by the arrow C) along the short sides of the rectangular second metal separator 32. The second bypass stop protrusions 94 are formed to protrude toward the resin film equipped MEA 28 (see FIG. 2). A plurality of the second bypass stop protrusions 94 are arranged at intervals in the direction (indicated by the arrow B) in which the end wavy ridges 58a1 extend.

Figure 6:
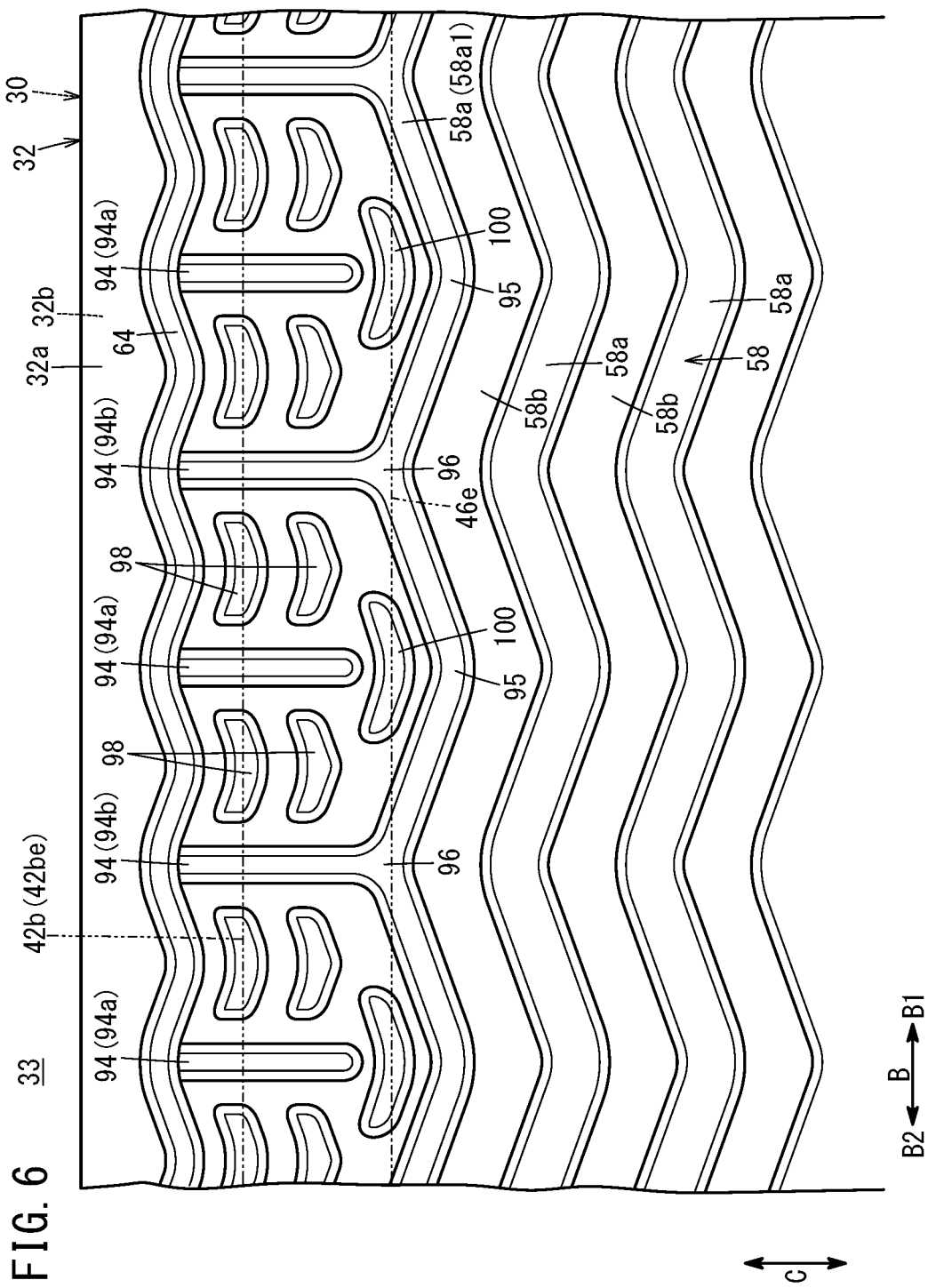
FIG. 6 is an enlarged plan view showing main components of the second metal separator.

As shown in FIG. 6, each of the end wavy ridges 58a1 includes recessed curves 95 recessed away from the outer peripheral bead 64, and protruding curves 96 protruding toward the outer peripheral bead 64. The plurality of second bypass stop protrusions 94 include second bypass stop protrusions 94a provided between the recessed curves 95 of the end wavy ridge 58a1 and the outer peripheral bead 64, and second bypass stop protrusions 94b provided between the protruding curves 96 of the end wavy ridge 58a1 and the outer peripheral bead 64. The second bypass stop protrusions 94a and the second bypass stop protrusions 94b are provided alternately at intervals in the direction in which the end wavy ridge 58a1 extends.

The second bypass stop protrusions 94a each have one end connected to the outer peripheral bead 64, and the other end spaced from the recessed curve 95 of the end wavy ridge 58a1. The second bypass stop protrusions 94b each have one end connected to the outer peripheral bead 64, and the other end connected to the protruding curve 96 of the end wavy ridge 58a1. Intermediate protrusions 98 supporting the outer peripheral portion of the MEA 28a are provided between the second bypass stop protrusions 94a, 94b that are adjacent to each other. The intermediate protrusions 98 protrude toward the resin film equipped MEA 28.

A plurality of the intermediate protrusions 98 are provided in each position between the second bypass stop protrusions 94a, 94b that are adjacent to each other. The direction in which the plurality of intermediate protrusions 98 are arranged between the second bypass stop protrusions 94a, 94b that are adjacent to each other is different from the direction in which the plurality of intermediate protrusions 89 (FIG. 4) are arranged between the first bypass stop protrusions 84a, 84b that are adjacent to each other. Specifically, in the embodiment of the present invention, the plurality of intermediate protrusions 98 are provided at intervals in the direction in which the end wavy ridge 58a1 is spaced from the outer peripheral bead 64 (in the direction indicated by the arrow C), between the second bypass stop protrusions 94a, 94b that are adjacent to each other. The intermediate protrusions 98 are provided at positions overlapping with the outer peripheral area and the outer end 42be of the second gas diffusion layer 42b, as viewed in the stacking direction.

In the second metal separator 32, second support protrusions 100 are provided between the recessed curves 95 of the end wavy ridge 58a1 and the second bypass stop protrusions 94a. The second support protrusions 100 support the anode 42 (second gas diffusion layer 42b). The second support protrusions 100 are formed by press forming to protrude toward the resin film equipped MEA 28. Each of the second support protrusions 100 is curved like a boomerang in plan view, along the curved shape of the recessed curve 95, as viewed in the thickness direction of the second metal separator 32. That is, the second support protrusions 100 are curved to protrude toward the end wavy ridge 58a1 in plan view. The length of the second support protrusions 100 in the direction in which the end wavy ridge 58a1 extends (the direction indicated by the arrow B) is larger than the width of the second bypass stop protrusions 94a. That is, the second support protrusions 100 protrude from the second bypass stop protrusions 94a in the direction in which the end wavy ridge 58a1 extends (in the direction indicated by the arrow B). Each of the second bypass stop protrusions 94 faces the central part of the second support protrusion 100 in the length direction.

The shape of the second support protrusions 100 is different from the shape of the first support protrusions 85 (FIG. 4). In the embodiment of the present invention, the second support protrusions 100 are spaced from the recessed curves 95 of the end wavy ridge 58a1 and the second bypass stop protrusions 94a. In the structure, it is possible to improve the rigidity of the second metal separator 32. It should be noted that each of the second support protrusions 100 may extend integrally with at least one of the recessed curve 95 of the end wavy ridge 58a1 and the second bypass stop protrusion 94a.

Figure 8:
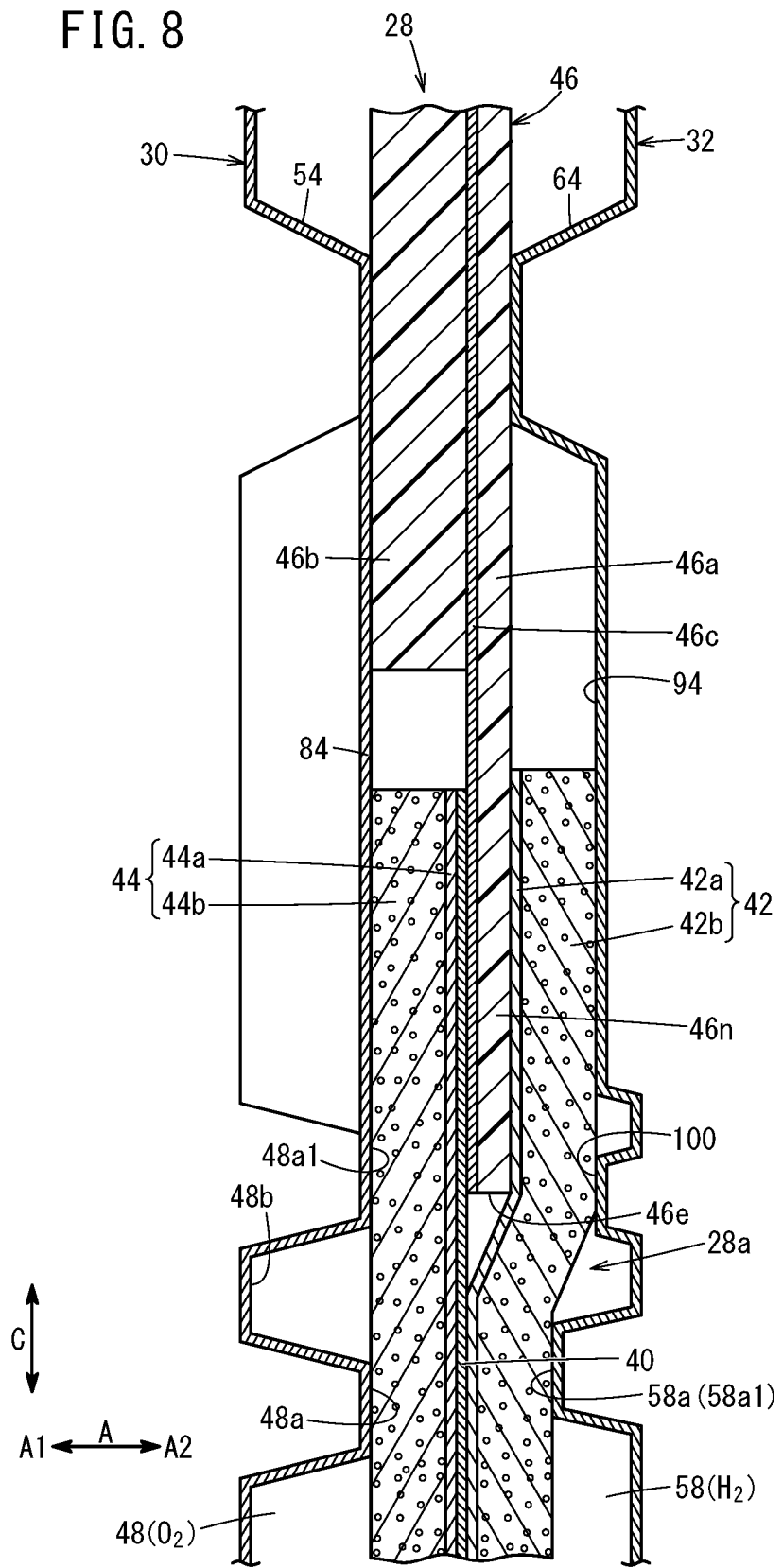
FIG. 8 is a cross sectional view taken along a line VIII-VIII in FIG. 4.

The second support protrusions 100 are provided at a position corresponding to the inner end 46e of the frame shaped resin film 46 (a position overlapping with the inner end 46e of the resin film 46, as viewed in the stacking direction). As shown in FIG. 8, the second support protrusions 100 support the anode 42 (second gas diffusion layer 42b) at the position where the outer peripheral portion of the MEA 28a and the inner peripheral portion 46n of the resin film 46 overlap each other in the thickness direction.

Figure 7:
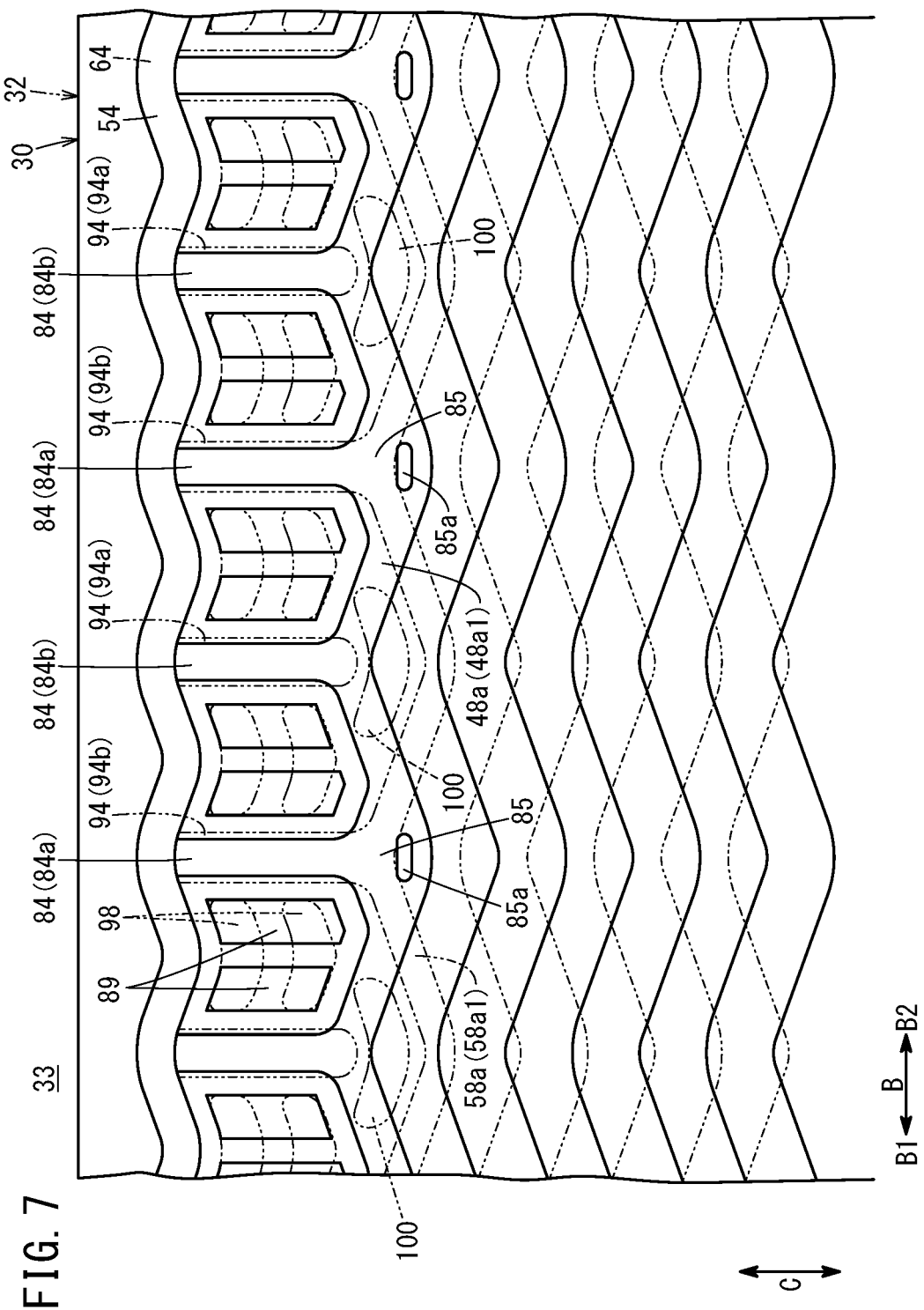
FIG. 7 is a view showing a state where the first metal separator and the second metal separator are superposed on each other.

As shown in FIG. 7, the wavy ridges 48a of the oxygen-containing gas flow field 48 and the wavy ridges 58a of the fuel gas flow field 58 are, seen in the stacking direction, formed to have wavy shapes having the same wavelength and in opposite phases to each other. The first support protrusions 85 of the first metal separator 30 and the second support protrusions 100 of the second metal separator 32 are provided alternately in the direction in which the wavy ridges 48a, 58a extend.

As shown in FIG. 2, each of the first support protrusions 85 faces the end wavy ridge 58a1 of the second metal separator 32 through the MEA 28a. Therefore, as shown in FIG. 7, the first support protrusions 85 overlap with the end wavy ridge 58a1 of the second metal separator 32, as viewed in the stacking direction.

As shown in FIG. 8, each of the second support protrusions 100 faces the end wavy ridge 48a1 of the first metal separator 30 through the MEA 28a. Therefore, as shown in FIG. 7, the second support protrusions 100 overlap with the end wavy ridge 48a1 of the first metal separator 30, as viewed in the stacking direction.

As shown in FIG. 1, a coolant flow field 66 is formed between the surface 30b of the first metal separator 30 and the surface 32b of the second metal separator 32 that are joined together. The coolant flow field 66 is connected to (in fluid communication with) the coolant supply passage 36a and the coolant discharge passage 36b. The coolant flow field 66 is formed by stacking the surface of the first metal separator 30 on the back of the oxygen-containing gas flow field 48 and the surface of the second metal separator 32 on the back of the fuel gas flow field 58 together.

Operation of the power generation cell 12 having the above structure will be described below.

Firstly, as shown in FIG. 1, an oxygen-containing gas such as the air is supplied to the oxygen-containing gas supply passage 34a. A fuel gas such as a hydrogen-containing gas is supplied to the fuel gas supply passage 38a. Coolant such as pure water, ethylene glycol, oil is supplied to the coolant supply passage 36a.

The oxygen-containing gas is supplied from the oxygen-containing gas supply passage 34a into the oxygen-containing gas flow field 48 of the first metal separator 30. Then, as shown in FIG. 3, the oxygen-containing gas flows along the oxygen-containing gas flow field 48 in the direction indicated by the arrow B, and the oxygen-containing gas is supplied to the cathode 44 of the MEA 28a.

In the meanwhile, as shown in FIG. 1, the fuel gas from the fuel gas supply passage 38a flows into the fuel gas flow field 58 of the second metal separator 32. As shown in FIG. 5, the fuel gas flows along the fuel gas flow field 58 in the direction indicated by the arrow B, and the fuel gas is supplied to the anode 42 of the MEA 28a.

Thus, in each MEA 28a, the oxygen-containing gas supplied to the cathode 44 and the fuel gas supplied to the anode 42 are consumed in electrochemical reactions in the first electrode catalyst layer 44a and the second electrode catalyst layer 42a to generate electricity.

Then, as shown in FIG. 1, the oxygen-containing gas supplied to, and consumed at the cathode 44 flows from the oxygen-containing gas flow field 48 to the oxygen-containing gas discharge passage 34b, and the oxygen-containing gas is discharged along the oxygen-containing gas discharge passage 34b in the direction indicated by the arrow A. Likewise, the fuel gas supplied to, and consumed at the anode 42 flows from the fuel gas flow field 58 to the fuel gas discharge passage 38b, and the fuel gas is discharged along the fuel gas discharge passage 38b in the direction indicated by the arrow A.

Further, the coolant supplied to the coolant supply passage 36a flows into the coolant flow field 66 formed between the first metal separator 30 and the second metal separator 32. Thereafter, the coolant flows in the direction indicated by the arrow B. After the coolant cools the MEA 28a, the coolant is discharged from the coolant discharge passage 36b.

In this case, the power generation cell 12 according to the embodiment of the present invention offers the following advantages.

In the power generation cell 12, the first bypass stop protrusions 84 are provided between the recessed curves 87 recessed away from the outer peripheral bead 54 in the end wavy ridge 48a1 and the outer peripheral bead 54. The first metal separator 30 has the first support protrusions 85 for supporting the cathode 44. The first support protrusions 85 are each provided between the recessed curve 87 and the first bypass stop protrusion 84 (FIG. 4). Further, the second bypass stop protrusions 94 are provided between the recessed curves 95 recessed away from the outer peripheral bead 64 in the end wavy ridge 58a1 and the outer peripheral bead 64. The second metal separator 32 has the second support protrusions 100 for supporting the anode 42 (FIG. 6).

Therefore, it is possible to support the ends of the MEA 28a in the width direction (the ends in the direction indicated by the arrow C) not only by the first bypass stop protrusions 84 and the second bypass stop protrusions 94 but also by the first support protrusions 85 and the second support protrusions 100. Thus, it is possible to prevent the decrease in surface pressure (tightening load) at the ends of the MEA 28a in the width direction. Accordingly, it is possible to suppress decrease in power generation performance and durability due to the decrease in the surface pressure applied to the power generation cell 12.

In the power generation cell 12, the support protrusions (the first support protrusion 85 and the second support protrusion 100) are provided in the first metal separator 30 and the second metal separator 32, respectively. In the structure, it is possible to suitably prevent the decrease in surface pressure at the ends of the power generation cell 12 in the width direction, in both of the first metal separator 30 and the second metal separator 32.

The first support protrusions 85 of the first metal separator 30 and the second support protrusions 100 of the second metal separator 32 are positioned alternately in the direction in which the wavy ridges 48a, 58a extend (FIG. 7). In the structure, it is possible to suitably support the MEA 28a in the direction in which the wavy ridges 48a, 58a extend.

The first support protrusions 85 and the second support protrusions 100 have different shapes. In the structure, it is possible to provide the first support protrusions 85 and the second support protrusions 100 having the shapes suitable for supporting the cathode 44 and the anode 42, respectively, in the first metal separator 30 and the second metal separator 32.

The first support protrusions 85 of the first metal separator 30 face the end wavy ridge 58a1 of the second metal separator 32 through the MEA 28a (FIG. 2). The second support protrusions 100 of the second metal separator 32 face the end wavy ridge 48a1 of the first metal separator 30 through the MEA 28a (FIG. 8). In the structure, the MEA 28a is supported between the first support protrusions 85 and the end wavy ridge 58a1 of the second metal separator 32, and the MEA 28a is supported between the second support protrusions 100 and the end wavy ridge 48a1 of the first metal separator 30. Therefore, it is possible to suppress the decrease in surface pressure at the ends of the MEA 28a in the width direction effectively to a greater extent.

The present invention is not limited to the above described embodiment. Various modifications may be made without deviating from the gist of the present invention.

What is claimed is:

1. A power generation cell comprising:
a membrane electrode assembly formed by providing electrodes on both sides of an electrolyte membrane; and
metal separators provided on both sides of the membrane electrode assembly including a first separator provided on a first side of the membrane electrode assembly and a second separator provided on a second side of the membrane electrode assembly, the power generation cell having a plurality of wavy ridges extending from one end to another end of the metal separators, and a plurality of wavy flow grooves formed between the plurality of wavy ridges,
wherein:
a reactant gas flow field is formed in the power generation cell, for allowing a reactant gas to flow from the one end to the other end of the metal separators along a power generation surface;
a bead seal configured to prevent leakage of the reactant gas is provided around the reactant gas flow field;
a bypass stop protrusion, configured to prevent bypassing of the reactant gas, is formed between an end of the reactant gas flow field in a flow field width direction and the bead seal;
the bypass stop protrusion is provided between a recessed curve, recessed away from the bead seal at the end of the wavy ridges in the flow field width direction, and the bead seal;
at least one of the metal separators includes a support protrusion configured to support the electrode, the support protrusion located between the recessed curve and the bypass stop protrusion,
and wherein the bypass stop protrusion, the support protrusion and the recessed curve are aligned with each other in a substantially straight line.

2. The power generation cell according to claim 1, wherein the support protrusion is provided in each of the first and second metal separators.

3. The power generation cell according to claim 2, wherein the support protrusion of one of the metal separators and the support protrusion of the other of the metal separators are arranged alternately in a direction in which the wavy ridges extend.

4. The power generation cell according to claim 2, wherein a shape of the support protrusion of one of a pair of the metal separators is different from a shape of the support protrusion of the other of the pair of the metal separators.

5. The power generation cell according to claim 2, wherein the support protrusion of one of the metal separators faces the wavy ridge provided at the end in the flow field width direction of the other of the metal separators through the membrane electrode assembly.

6. The power generation cell according to claim 1, wherein a frame shaped resin film is provided in an outer peripheral portion of the membrane electrode assembly; and
the support protrusion supports the electrode at a position where the membrane electrode assembly and the resin film overlap each other in a thickness direction.

7. The power generation cell according to claim 1, wherein a plurality of the bypass stop protrusions are provided at intervals in a direction in which the wavy ridges extend.

8. The power generation cell according to claim 1, wherein, in one of the metal separators, the support protrusion is continued to the bypass stop protrusion and the wavy ridge provided at the end in the flow field width direction, among the plurality of wavy ridges.

9. The power generation cell according to claim 1, wherein, in the second metal separator DE the support protrusion is spaced from the bypass stop protrusion and the wavy ridge provided at the end in the flow field width direction, among the plurality of wavy ridges.

10. The power generation cell according to claim 9, wherein the support protrusion provided in the other of the metal separators has a curved shape in plan view.

11. The power generation cell according to claim 10, wherein the support protrusion provided in the other of the metal separators is curved along a curved shape of the recessed curve.

12. The power generation cell according to claim 9, wherein a length of the support protrusion provided in the other of the metal separators in a direction in which the wavy ridges extend is larger than a width of the bypass stop protrusion.

13. The power generation cell according to claim 1, wherein, in one of the metal separators, the support protrusion is continued to the bypass stop protrusion and the wavy ridge provided at an end in the flow field width direction, among the plurality of wavy ridges; and
in the other of the metal separators, the support protrusion is spaced from the bypass stop protrusion and the wavy ridge provided at the end in the flow field width direction, among the plurality of wavy ridges.

14. The power generation cell according to claim 1, wherein:
said bypass stop protrusion is a first bypass stop protrusion, and a second bypass stop protrusion is provided between the bead seal and a protruding curve among the plurality of wavy ridges, the protruding curve protruding toward the bead seal at the end of the reactant gas flow field in the flow field width direction, and
the first bypass stop protrusion and the second bypass stop protrusion are provided alternately in a direction in which the plurality of wavy ridges extend.

15. A power generation cell comprising:
a membrane electrode assembly formed by providing electrodes on both sides of an electrolyte membrane; and
metal separators provided on both sides of the membrane electrode assembly, the power generation cell having a plurality of wavy ridges extending from one end to another end of the metal separators, and a plurality of wavy flow grooves formed between the plurality of wavy ridges, wherein:

a reactant gas flow field is formed in the power generation cell, for allowing a reactant gas to flow from the one end to the other end of the metal separators along a power generation surface;

a bead seal, configured to prevent leakage of the reactant gas, is provided around the reactant gas flow field;

a bypass stop protrusion, configured to prevent bypassing of the reactant gas, is formed between an end of the reactant gas flow field in a flow field width direction and the bead seal, the bypass stop protrusion provided between a recessed curve, recessed away from the bead seal at the end of the wavy ridges in the flow field width direction, and the bead seal;

at least one of the metal separators includes a support protrusion configured to support the electrode, the support protrusion located between the recessed curve and the bypass stop protrusion, and wherein a recess, protruding on a coolant surface side, is provided in a vicinity of the support protrusion, and a front end of an abutting protrusion, on a back of the recess, abuts on another metal separator adjacent to the abutting protrusion.

* * * * *